United States Patent [19]

Laughner et al.

[11] Patent Number: 5,196,479
[45] Date of Patent: Mar. 23, 1993

[54] IMPACT RESISTANT BLENDS OF HIGH HEAT POLYCARBONATE AND AROMATIC POLYESTER

[75] Inventors: Michael K. Laughner, Lake Jackson; Hani Farah, Sugarland, both of Tex.

[73] Assignee: The Dow Chemical Company, Midland, Mich.

[21] Appl. No.: 661,755

[22] Filed: Feb. 27, 1991

[51] Int. Cl.$^5$ .................. C08L 71/12; C08L 69/00; C08L 67/03
[52] U.S. Cl. .......................... 525/67; 525/68; 525/92; 525/133; 525/394; 525/397; 525/439; 525/905; 528/196; 528/202; 528/204
[58] Field of Search .............. 525/67, 68, 92, 394, 525/397, 439, 905, 133; 528/202, 204, 196

[56] References Cited

U.S. PATENT DOCUMENTS

| | | | |
|---|---|---|---|
| 4,485,219 | 11/1984 | Falk et al. | 525/394 |
| 4,806,297 | 2/1989 | Brown et al. | 264/102 |
| 4,866,130 | 9/1989 | Brown et al. | 525/92 |

FOREIGN PATENT DOCUMENTS

| | | |
|---|---|---|
| 0147653 | 7/1985 | European Pat. Off. |
| 0283837 | 9/1988 | European Pat. Off. |
| 0306774 | 3/1989 | European Pat. Off. |

*Primary Examiner*—James J. Seidleck
*Assistant Examiner*—Thomas Hamilton, III
*Attorney, Agent, or Firm*—John A. Langworthy

[57] ABSTRACT

A composition possessing a desirably high balance of resistance to thermal deformation and to chemical solvents, and reduced notch sensitivity, prepared from a polycarbonate having a glass transition temperature in excess of at least 165° C., an aromatic polyester, a polyphenylene ether, and an elastomeric impact modifier.

43 Claims, No Drawings

IMPACT RESISTANT BLENDS OF HIGH HEAT POLYCARBONATE AND AROMATIC POLYESTER

FIELD OF THE INVENTION

This invention relates to carbonate polymers, particularly those which have good resistance to thermal deformation, and to compositions formed therefrom.

BACKGROUND OF THE INVENTION

Polycarbonate is a useful engineering thermoplastic because it possesses, in general, a combination of several different favorable properties. Certain polycarbonates which have a glass transition temperature exceeding at least 165° C., known as "high heat" polycarbonates, additionally have better resistance to thermal deformation than others. However, it is often found that a high heat polycarbonate is notch sensitive to impact loading, and often is undesirably subject to failure by brittle fracture. Brittle fracture, in this context, is usually indicated when a point of applied stress where fracture occurs exhibits smooth fracture surfaces, does not exhibit shear lips, and is not hinged. As a consequence of its brittleness, a high heat polycarbonate typically exhibits a low level of toughness, manifested particularly as notch sensitivity to impact loading, at a sufficiently high level to outweigh the benefits which would otherwise be obtainable from its superior resistance to thermal deformation.

Previous efforts to modify polycarbonate by blending it with materials such as a polyester, or polyester and an elastomeric impact modifier, as disclosed for example by U.S. Pat. Nos. 3,864,428 and 4,654,400, fail to address the special problems posed when a material possessing the brittleness, heat resistance and high viscosity of a high heat polycarbonate is incorporated into a blend. When a blend is formed form polyester and a polycarbonate which has a $T_g$ of about 150° C. or less, the brittleness which would be present in the resulting blend because of the presence of the polyester can be more readily offset by the addition of an elastomer because the matrix provided by a polycarbonate which does not possess exceptionally high thermal resistance is ductile in and of itself. Experience with such varities of ductile polycarbonate does not therefore furnish any guidance concerning reducing the brittleness of a high heat polycarbonate.

Polyester tends to be a brittle, notch-sensitive material itself, and even an elastomeric impact modifier is not always adequate to significantly reduce the inherent brittleness of a blend of polyester with a high heat polycarbonate. Moreover, regardless of the system selected to reduce the notch sensitivity to impact loading of a high heat polycarbonate composition, the high viscosity inherent in a high heat polycarbonate requires that, in preparation of a composition, a high heat polycarbonate be selected which will allow for easy and convenient processing on known types of equipment.

It would accordingly be desirable, if by employing appropriate methods and materials, the notch sensitivity to impact loading of high heat polycarbonate could be reduced and its impact strength and toughness could be transformed into a characteristics as valuable as, and existing simultaneously with, its resistance to thermal deformation, particularly when the high heat polycarbonate is blended with a polyester. A feature of this invention, therefore, is a blended composition of a high heat polycarbonate and a polyester which has a desirably high level of impact resistance and resistance to thermal deformation in combination with a desirably high level of chemical resistance and which is easily processed.

SUMMARY OF THE INVENTION

This invention involves a composition of matter containing, in admixture, (a) a high heat polycarbonate, (b) an aromatic polyester, and (c) a polyphenylene ether (including alloys thereof with styrenic polymers or copolymers), and (d) an elastomeric impact modifier.

This invention also involves a method of molding a high heat polycarbonate whereby high heat polycarbonate which has been admixed with an aromatic polyester, a polyphenylene ether and an elastomeric impact modifier is molded, in addition to a method of compounding or forming an article from a high heat polycarbonate composition. Further, this invention involves a method of strengthening, or reducing the notch sensitivity of, a high heat polycarbonate by blending it with an aromatic polyester, a polyphenylene ether and an elastomeric impact modifier. Blending a polycarbonate/polyester composition with a polyphenylene ether and an elastomeric impact modifier is also a method of providing an improved polycarbonate/polyester composition.

It has been found that a composition prepared by blending or admixing a high heat polycarbonate with an aromatic polyester, a polyphenylene ether, and an elastomeric impact modifier possesses Izod impact strength which is superior to that of high heat polycarbonate/polyester blends, and to that of such blends modified with only a polyphenylene ether or only an elastomeric impact modifier. It has also been found that the polycarbonate/polyester blended compositions of this invention have a unique balance of desirably high levels of resistance to solvents and thermal deformation and a desirably low level of notch sensitivity, and they are easily processed.

The compositions of this invention are useful, for example, in the production of films, fibers, extruded sheets, multi-layer laminates and molded or shaped articles of virtually all varieties, especially appliance and instrument housings, automobile body panels and other components for use in the automotive and electronics industries. The methods of this invention are useful for preparing compositions and molded articles having applications which are the same as or similar to the foregoing.

DETAILED DESCRIPTION OF THE INVENTION

The compositions of this invention are those in which (a) a high heat polycarbonate has been admixed in a blended composition with (b) an aromatic polyester, and (c) a polyphenylene ether, and (d) an elastomeric impact modifier. Suitable ranges of content for components (a), (b), (c) and (d) in the compositions of this invention, expressed in parts by weight of the total composition, are as follows:

(a) polycarbonate from about 30 parts to about 93 parts, advantageously from about 40 parts to about 90 parts, preferably from about 45 parts to about 85 parts, more preferably from about 50 parts to about 80 parts, and most preferably from about 55 parts to about 75 parts, (b) aromatic polyester from about 5 parts to about 69 parts, and preferably from about 10 parts to about 57 parts, (c) polyphenylene ether from about 1 part to about 40 parts, advantageously from about 1 part to about 25 parts, preferably from about 1 to about 15 parts, more preferably from about 1 part to about 10 parts, and most preferably from about 1 part to about 8 parts; and (d) elastomeric impact modifier from about 1 part to about 25 parts, and preferably from about 1 to about 15 parts.

The compositions of this invention, and those formed by the methods of this invention, are typically characterized by a heat deflection temperature under load ("DTUL"), determined according to ASTM 648-82 at 66 psi, exceeding 270° F., advantageously exceeding 280° F., preferably exceeding 290° F., and more preferably exceeding 295° F.

Preparation of the compositions of this invention can be accomplished by any suitable mixing means known in the art. Typically the substances to be admixed with polycarbonate are dry blended in particulate form with sufficient agitation to obtain thorough distribution thereof within the polycarbonate. If desired, the dry-blended formulation can further, but need not, be melt mixed in an extruder, with or without a vacuum, or otherwise compounded with additional substances. Mixing rolls, a dough-mixer or a Banbury mixer can also be used in the blending. Alternatively, a master batch formulation can be prepared containing polycarbonate or polyester, and the other substances to be admixed or blended with it, wherein polycarbonate or polyester is present in only a minor proportion, e.g. 20%. The master batch is then available for storage or shipment in commerce, and can be diluted with additional polycarbonate or polyester at the time of use.

When softened or melted by the application of heat, the compositions of this invention can undergo fabrication and can therein be formed or molded using conventional techniques such as compression, injection molding, calendering, vacuum forming, extrusion and/or blow molding techniques, alone or in combination. The compositions can also be formed, spun or drawn into films, fibers, multi-layer laminates or extruded sheets, or can be compounded with one or more organic or inorganic substances, on any machine suitable for such purpose.

Compositions prepared within the ranges of content stated above possess Izod impact strength which is superior to that of high heat polycarbonate/polyester blends, and to that of such blends modified with only a polyphenylene ether or only an elastomeric impact modifier.

(a) Polycarbonate. A polycarbonate with good thermal stability—a high heat polycarbonate—is defined as that which has a glass transition temperature ($T_g$) in excess of 165° C., advantageously in excess of 175° C., preferably in excess of 185° C., and most preferably in excess of 195° C. $T_g$ is the temperature or temperature range at which an amorphous polymeric material shows an abrupt change in its physical properties, including, for example, mechanical strength. $T_g$ can be determined by differential scanning calorimetry using, for example, a DuPont Instruments model 910 calorimeter.

The high heat polycarbonate suitable for use in this invention typically has a weight average molecular weight, as determined by gel permeation chromatography, of less than 40,000, advantageously less than 38,000, preferably less than 35,000, and more preferably less than 30,000. Because of its inherently high degree of resistance to thermal deformation, a polycarbonate which is characterized by high eat properties by reason of its structure, and which has in addition a weight average molecular weight exceeding 40,000, is difficult to heat soften for processing purposes. However, since a high heat polycarbonate having a lower molecular weight also has a higher ductile/brittle transition temperature, care must be taken that, in selecting a lower weight polycarbonate for easier processing, the result is not composition formed therefrom which is brittle. One of the advantageous features which is invention, therefore, is a composition which has reduced notched sensitivity to impact loading and which, because of the presence of a high heat polycarbonate as described herein, has a desirably high level of heat resistance and is easily processed.

The polycarbonate involved in this invention can be prepared from those aromatic dihydroxy compounds which yield a high heat polycarbonate, being that which has a glass transition temperature ($T_g$) in excess of at least 165° C. The aromatic dihydroxy compounds which yield a high heat polycarbonate are typically derivatives of a diol such Bisphenol-A, and frequently are those which yield a polycarbonate product containing on the backbone of the repeating unit numerous bulky substituents, such as halogen, or higher or branched alkyl, aryl, alkoxy or aryloxy substituents or the like, and mixtures thereof.

Representative examples of high heat polycarbonates are those formed from dihydroxy compounds such as (i) 2,2-bis(3,5-dihalo-4-hydroxyphenyl)propane ("Tetrahalo Bisphenol-A") where the halogen can be fluorine, chlorine, bromine or iodine, for example, 2,2-bis(3,5-dibromo-4-hydroxyphenyl)propane ("Tetrabromo Bisphenol-A" or "TBBA");

(ii) 2,2-bis(3,5-dialkyl-4-hydroxyphenyl)propane ("Tetraalkyl Bisphenol-A") where the alkyl can be methyl or ethyl, for example 2,2-bis(3,5-dimethyl-4-hydroxyphenyl)propane ("Tetramethyl Bisphenol-A");

(iii) 1,1-bis(4-hydroxyphenyl)-1-phenyl ethane ("Bisphenol-AP" or "Bis-AP");

(iv) Bis(hydroxyphenyl)α-diphenylenemethane, ("Bis(-hydroxyphenyl)fluorene");

or are copolymers formed from any of the foregoing dihydroxy compounds with other dihydroxy compounds, such as 2,2-bis(4-hydroxyphenyl)propane ("Bisphenol-A" or "Bis-A"). A polycarbonate formed from Bisphenol-A alone does not, however, meet the definition of a high heat polycarbonate of this invention.

A dihydroxy compound capable of producing a high heat polycarbonate can be reacted with a carbonate precursor, such as a carbonic acid derivative. A carbonic acid derivative such as the carbonyl halide phosgene is useful for such purpose. However, even with the application of heat, the direct contact of an aromatic dihydroxy compound and a carbonic acid derivative does not produce a reaction with a rate sufficient to form polycarbonate. The reaction should therefore be facilitated by the presence in the reaction mixture of pyridine or another tertiary amine. The salt-like adduct of the carbonic acid derivative which is formed with the amine reacts more favorably with the dihydroxy compound than the carbonic acid derivative itself. The reaction should be carried out in the absence of water to avoid hydrolysis of the carbonic acid derivative, and a non-reactive organic solvent is used which will keep the polycarbonate product in a viscous solution as it forms. The non-reactive solvent is frequently methylene chloride or another halogenated hydrocarbon, or benzene or toluene. When the formation of polycarbonate is complete, the reaction mixture is washed with an aqueous solution of a mineral acid to convert any remaining amine to its corresponding salt, and the organic phase is washed further with water to remove acidic electrolytes. The solvent can be removed from the organic phase by distillation. Alternatively, the polycarbonate may be precipitated from the organic phase by a non-solvent such as petroleum ether, methanol, isopropanol or an aliphatic hydrocarbon.

Even at temperatures as low as from 0° C. to 40° C., a carbonic acid derivative reacts at a better rate with deprotonated aromatic dihydroxy compounds than it does in a non-aqueous system. A solution is formed of (i) an aromatic dihydroxy compound and a strong base in aqueous phase, and (ii) an inert, immiscible organic solvent which will dissolve both the carbonic acid derivative and the polycarbonate product. Solvents such as xylene or methylene chloride or other chlorinated hydrocarbons are suitable for such purpose. Caustic such as the the alkali or alkaline earth carbonates, oxides or hydroxides function best as the base, the total amount of which may be added at the beginning of, or incrementally during, the reaction. A pH of about 10 to 13 is typically maintained throughout the reaction. The base forms the dianion of the aromatic dihydroxy compound in the aqueous phase, and the aqueous phase forms a continuous phase with the organic solvent dispersed, upon agitation, as droplets therein. Carbonic acid derivative is bubbled into this mixture, is dissolved in the organic solvent, and reacts with the aromatic dihydroxy compound at the interface of the droplets with the aqueous phase. Catalysts accelerate the rate of the reaction sufficiently to allow the formation of high polycarbonates at the same low temperature at which the reaction began. Suitable catalysts for such purpose are tertiary amines such as triethylamine, N,N-dimethyl-cyclohexylamine or dimethyl-amino-pyridine, or quarternary ammonium bases such as tetramethyl ammonium hydroxide or triethyl benzyl ammonium hydroxide, or quaternary phosphonium, quarternary arsenium or tertiary sulfonium compounds. A bisaryl ester can be used in placed of a carbonic acid derivative.

Polycarbonate can additionally be made by transesterification, which is accomplished by reacting a dihydroxy compound with a bis carbonic acid ester. A strongly alkaline catalyst such as the alkali metals and the alkaline earth metals and their oxides, hydrides or amides, or the basic metal oxides such as zinc oxide, lead oxide and antimony oxide is used as an accelerator, and the reaction is run at temperatures of between 150° C. and 300° C., using vacuum to remove the residue of the bis carbonic acid ester. At temperatures between 150° C. and 200° C., low molecular weight polycarbonate terminated with bis carbonic acid ester groups is formed, which can then interreact at temperatures about 250° C. to form higher weight polycarbonate by splitting off the original bis carbonic acid ester. This process is carried out at reduced pressure.

Suitable dihydroxy compounds for the preparation of polycarbonate are those wherein the sole reactive groups are two hydroxyl groups, such as variously bridged, substituted or unsubstituted aromatic diols ("bisphenols"), or mixtures thereof, represented by the general formula

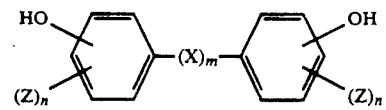

where (i) X is a substituted or unsubstituted, linear or cyclic, divalent hydrocarbon radical containing 1-20 carbon atoms, or is a mixture of more than one of such radicals, or is —S—, —S—S—, —SO—, $SO_2$—, —O—, —CO—, or a single bond; (ii) Z is independently hydrogen; a halogen such as fluorine, chlorine, bromine or iodine; or is a monovalent organic radical such as an alkyl group of 1-4 carbons, an aryl group of 6-8 carbons (e.g. phenyl, tolyl, xylyl or the like), an alkoxy group of 1-4 carbons, or an aryloxy group of 6-8 carbons, provided that at least one Z is not hydrogen; and (iii) m is 0 or 1, and n is 1-4 inclusive. For example, Bis(hydroxyphenyl)fluorene can be represented by the formula

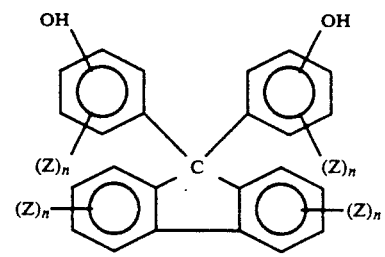

where Z and n are as set forth above except that each Z may be hydrogen.

When the high heat character of a polycarbonate, as indicated by a $T_g$ or DTUL in the ranges set forth above, derives from the presence of halogen substituents (such as chlorine or bromine) on a dihydroxy compound, the high heat polycarbonate will typically contain at least 20 percent halogen by weight.

The carbonate polymers employed in the present invention can also be high heat polycarbonates based on dihydroxy benzenes such as pyrocatechol, resorcinol and hydroquinone (and their halo- and alkyl-substituted derivatives), and on dihydroxy naphthalenes and anthracenes.

Although the polycarbonates mentioned above, such as those derived from Bis(hydroxyphenyl) fluorene or from Bisphenol-AP, can each be employed in this invention as a homopolymer (i.e. the product obtained when only one dihydroxy compound is used to prepare the polycarbonate), the carbonate polymers used herein can also be derived from two or more different dihydroxy compounds, or mixtures thereof, in the event a carbonate copolymer or interpolymer rather than a homopolymer is desired. For example, a typical copolymer is that which is made from Bisphenol-A and Tetrabromo Bisphenol-A wherein the Tetrabromo Bisphenol-A is present in at least the amount of twenty percent by weight.

Copolymers can also be formed when a bisphenol is reacted with a carbonic acid derivative and a polydiorganosiloxane containing α,ω-bishydroxyarayloxy terminal groups to yield a siloxane/carbonate block copolymer (as are discussed in greater detail in Paul, U.S. Pat. No. 4,569,970, incorporated as a part hereof), or when a bisphenol is reacted with a dicarboxylic acid (or ester-forming derivative) or with a bis(ar-haloformylaryl)

carbonate to yield an alternating copolyestercarbonate, the bis(ar-haloformylaryl) carbonate being formed by reacting a hydroxycarboxylic acid with a carbonic acid derivative under carbonate forming conditions. Copolyestercarbonates are discussed in greater detail in Swart, U.S. Pat. No. 4,105,533, incorporated as a part hereof.

Also useful in this invention are physical blends of two or more of the carbonate homo- and/or copolymers described above. The term "polycarbonate" as used herein, and in the claims appended hereto, should therefore be understood to include carbonate homopolymers, carbonate copolymers (as described above), and/or blends of various carbonate homopolymers and/or various carbonate copolymers, so long as the resulting homopolymer or copolymer has a $T_g$ exceeding at least 165° C. Where a blend of more than one carbonate homopolymer and/or copolymer is used, the blend of such polycarbonates, if miscible, will have a $T_g$ exceeding at least 165° C. In the case where a blend of high heat polycarbonates is immiscible, the component(s) constituting more than 50 weight percent of such blend of polycarbonates will have a $T_g$ exceeding at least 165° C.

The methods generally described above for preparing carbonate polymers suitable for use in the practice of this invention are well known; for example, several methods are discussed in detail in Schnell, U.S. Pat. No. 3,028,365; Campbell, U.S. Pat. No. 4,384,108; Glass, U.S. Pat. No. 4,529,791; and Grigo, U.S. Pat. No. 4,677,162, each of which is incorporated as a part hereof.

(b) Polyester. The aromatic polyester used in this invention may be made by a variety of methods. Although the self-esterification of hydroxycarboxylic acids is known, direct esterification, which involves the reaction of a diol with a dicarboxylic acid with the resulting elimination of water, is a more frequently used method for commercial production, giving an -[-AABB-]- polyester. Although the presence of a catalyst such as p-toluene sulfonic acid, a titanium alkoxide or a dialkyltin oxide is helpful, the primary driving force behind the direst esterification reaction is heat. Temperatures applied exceed the melting points of the reactants and typically approach the boiling point of the diol being used, and usually range from about 150° C. to about 280° C. An excess of the diol is typically used, and once all of the acid has reacted with diol, the excess diol is removed by distillation with the application of additional heat under reduced pressure. The ester of the diacid initially formed from the diol, having —OH end groups, undergoes alcoholysis and polymerization to form polymeric esters and the diol is split out as a by-product and removed from the reaction zone. The reaction is typically carried out in the presence of an inert gas.

Alternatively, but in like manner, ester-forming derivatives of a dicarboxylic acid can be heated with a diol to obtain polyesters in an ester interchange reaction. Suitable acid derivatives for such purpose are esters, halides, salts or anhydrides of the acid. When a bis ester of the diacid is used for purposes of the interchange reaction, the alcohol from which the ester is formed (the alcohol to be displaced) should be lower boiling than the diol to be used for formation of polyester (the displacing alcohol). the reaction can then be conveniently run at a temperature at or below the boiling point of the displacing alcohol but well above that of the displaced alcohol, and is usually run in a temperature range similar to that for direct esterification. The ester interchange reaction is typically run in the presence of a diluent, for example, an inert organic solvent such as chloroform or tetrachloroethane, and in the presence of a base, for example a tertiary organic base such as pyridine. Typical catalysts used when ester interchange involves alcoholysis are weak bases such as carbonates or alkoxides of sodium, lithium zinc, calcium, magnesium or aluminum, whereas catalyst such as antimony oxide, titanium butoxide or sodium acetate are often used when acidolysis occurs in the interchange reaction. Diol derivatives such as an acetate can be used effectively when it is desired to conduct acidolysis.

Maintenance of high temperature is an important aspect of esterification, particularly toward the end of the reaction. As a consequence, thermal ester scission competes with polymer growth as the prevailing result of the process, which places an upper limit on the molecular weight which can be achieved through the use of melt polymerization. The molecular weight of polyester can be increased by adding a chin coupling agent, such as diphenyl carbonate, to the melt reaction mixture just prior its completion. Or, to achieve higher weight by solid state polymerization, polyester product of intermediate weight can be heated in a vacuum or stream of inert gas, first to a temperature where it crystallizes and then to a temperature close to its melting point.

Polyesters can also be produced by a ring-opening reaction of cyclic esters or lactones, for which organic tertiary bases and alkali and alkaline earth metals, hydrides and alkoxides can be used as initiators. Advantages offered by this type of reaction are that it can be run at lower temperatures, frequently under 100° C., and there is no need to remove a condensation product from the reaction.

Suitable reactants for making the polyester used in this invention, in addition to hydroxycarboxylic acids, are diols and dicarboxylic acids either or both of which can be aliphatic or aromatic. A polyester which is a poly(alkylene alkanedicarboxylate), a poly(alkylene phenylenedicarboxylate), a poly(phenylene alkanedicarboxylate), or a poly(phenylene phenylenedicarboxylate) is therefore appropriate for use herein. Alkyl portions of the polymer chain can be substituted with, for example, halogens, alkoxy groups or alkyl side chains and can contain divalent heteroatomic groups (such as —O—, —S— or —SO₂—) in the paraffinic segment of the chain. The chain can also contain unsaturation and non-aromatic rings. Aromatic rings can contain substituents such as halogens, alkoxy or alkyl groups, and can be joined to the polymer backbone in any ring position and directly to the alcohol or acid functionality or to intervening atoms.

Typical alkylene diols used in ester formation are the $C_2-C_{10}$ glycols, such as ethylene-, propylene-, and butylene glycol. Alkanedicarboxylic acids frequently used are oxalic acid, adipic acid and sebacic acid. Diols which contain rings can be, for example, a 1,4-cyclohexylenyl glycol or a 1,4-cyclohexanedimethylene glycol, resorcinol, hydroquinone, 4,4'-thiodiphenol, bis-(4-hydroxyphenyl)sulfone, a dihydroxynaphthalene, a xylylene diol, or can be one of the many bisphenols such as 2,2-bis-(4-hydroxyphenyl)propane. Aromatic diacids include, for example, terephthalic acid, isophthalic acid, naphthalenedicarboxylic acid, diphenyletheredicarboxylic acid, diphenyldicarboxylic acid, diphenylsulfonedicarboxylic acid, diphenoxyethanedicarboxylic acid.

In addition to polyesters formed from one diol and one diacid only, the term "polyester" as used herein includes random, patterned or block copolyesters, for example those formed from two or more different diols and/or two or more different diacids, and/or from other divalent heteroatomic groups. Mixtures of such copolyesters, mixtures of polyesters derived from one diol and diacid only, and mixtures of members from both of such groups, are also all suitable for use in this invention, and are all included in the term "polyester". For example, use of cyclohexanedimethylol together with ethylene glycol in esterification with terephthalic acid forms a clear, amorphous copolyester ("PETG") of particular interest. Also contemplated are PCTG; liquid crystalline polyesters derived from mixtures of 4-hydroxybenzoic acid and 2-hydroxy-6-naphthoic acid; or mixtures of terephthalic acid, 4-hydroxybenzoic acid and ethylene glycol; or mixtures of terephthalic acid, 4-hydroxybenzoic acid and 4,4'-dihydroxybiphenyl.

Aromatic polyesters such as the poly(alkylene phenylenedicarboxylates) polyethylene terephthalate and polybutylene terephthalate, or mixtures thereof, are particularly useful in this invention.

Methods and materials useful for the production of polyesters, as described above, are discussed in greater detail in Whinfield, U.S. Pat. No. 2,465,319, Pengilly, U.S. Pat. No. 3,047,539 and Russell, U.S. Pat. No. 3,756,986, each of which is incorporated herein by reference.

(c) Polyphenylene ether. The polyphenylene ethers (also known as polyphenylene oxides) useful in this invention comprise a plurality of structural units described generally by the formula

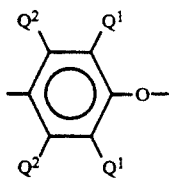

In each of said units independently, each $Q^1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. It is preferred that any alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with, for example, 2,3,6-trimethyl-1,4-phenylene ether units.

Also included are polyphenylene ethers containing moieties which modify properties such as molecular weight, melt viscosity and/or impact strength. Such polymers may be prepared by grafting onto the polyphenylene ether, in known manner, such vinyl monomers as acrylonitrile and vinylaromatic compounds (e.g., styrene), or such polymers as polystyrenes and elastomers. The product typically contains both grafted and ungrafted moieties. Other suitable polymers are the coupled polyphenylene ethers in which the coupling agent is reacted, in known manner, with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000–40,000, and a weight average molecular weight within the range of about 20,000–80,000, as determined by gel permeation chromatography. Its intrinsic viscosity is most often in the range of about 0.15–0.6, and preferably at least 0.25, dL/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen.

A variety of catalyst systems are known for the preparation of polyphenylene ethers by oxidative coupling. There is no particular limitation as to catalyst choice, and any of the known catalysts can be used. For the most part, they contain at least one heavy metal compound such as copper, manganese or cobalt compound, usually in combination with various other materials.

A first class of preferred catalyst systems consists of those containing a copper compound, such as are disclosed, for example, in U.S. Pat. Nos. 3,306,874, 3,306,875, 3,914,266 and 4,028,341, which are incorporated herein. They are usually combinations of cuprous or cupric ions, halide (i.e., chloride, bromide or iodide) ions and at least one amine.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, ω-hydroxyoximes (monomeric and polymeric), o-hydroxyaryl oximes and β-diketones. Also useful are known cobalt-containing catalyst systems.

The polyphenylene ether used herein may also be blended with at least one polystyrene. The term "polystyrene" includes polymers prepared by bulk, suspension or emulsion polymerization which contain at least 25 percent by weight structural units derived from a monomer described generally by the formula

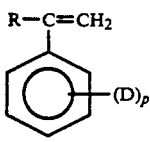

wherein R is hydrogen, lower alkyl or halogen, D is vinyl, halogen or lower alkyl, and p is from 0 to 5. These resins include homopolymers of styrene, chlorostyrene and vinyltoluene; random copolymers of styrene with one or more monomers illustrated by acrylonitrile, an alkyl acrylate, butadiene, α-methylstyrene, ethylvinylbenzene, divinylbenzene, maleic anhydride and phenyl maleimide; an ethylene/propylene/diene copolymer grafted with acrylonitrile and styrene; and rubber modified polystyrenes comprising blends and grafts, wherein the rubber is a polybutadiene or a rubbery copolymer of about 70-98 percent styrene and about 2-30 percent diene monomer. The polystyrenes may also be rubber modified by blending with a hydrogenated or unhydrogenated styrene/butadiene block copolymer, containing at least fifty percent styrene by weight, to create a high impact polystyrene ("HIPS").

The proportion of such polystyrene in the polyphenylene ether of this invention is not critical, since polyphenylene ether and styrenic polymers and copolymers are miscible in all proportions, but will typically be about 5-50 percent by weight, if any.

Polyphenylene ethers, as described above, are discussed in greater detail in U.S. Pat. No. 4,866,130, which is incorporated herein in its entirety.

(d) Elastomeric Impact Modifier. The elastomeric impact modifier used in this invention is a rubbery or elastomeric substance, typically with a $T_g$ less than 10° C., and preferably less than −5° C., which is suitable or effective for the purpose of imparting enough flexibility and freedom of chain rotation to a polycarbonate/polyester blend to improve its toughness; reduce its notch sensitivity; and enable it, in response to the deformation of an applied stress, to recover with stored modulus rather than fracture. The rubber content of the impact modifier used in this invention is typically greater than 40 percent by weight, and a mixture of two or more elastomeric substances can be used as the impact modifier.

Illustrative examples of elastomeric impact modifiers useful in this invention are thermoplastic elastomers, emulsion-type, core-shell graft copolymer elastomers, and olefinic elastomers.

The thermoplastic elastomers useful in this invention are those which typically have a $T_g$ less than 10° C., and preferably less than −5° C. They are characterized, for example, in that they can be melted and recooled, or dissolved and reformed upon removal of the solvent, without undergoing any change in properties. The thermoplastic elastomers suitable herein are also characterized by the randomness of the shape and size they take on when mixed by shearing forces with the other components making up the compositions of this invention, especially when heat is applied during such mixing. Because the thermoplastic elastomer is typically a long chain molecule, segments of thermoplastic elastomer in the polymer composition matrix are generally elongated, linear ribbons or bands. The molecules tend to fuse and flow together in a continuous structure. However, chain coiling can yield globule-shaped segments of thermoplastic elastomer in the matrix. The random shape and size assumed in the polymer composition matrix by a thermoplastic elastomer is to be distinguished from the shape and size assumed by a core-shell graft copolymer.

A core-shell graft copolymer is typically present in the polymer matrix in a bead shape both before and after mixing by application of shearing forces, whether heat is used or not, and is usually present in a rather narrow size range, for example 0.05-0.8 microns. The retention of this core-shell, or spherical, shape by the graft polymer, even after heating and mixing, results from the fact that the outer layers, which surround the core, are formed by grafting appropriate monomers onto the core. A core-shell graft copolymer typically cannot be melted and recooled without a change in properties because the graft polymer will tend to decompose or crosslink, and the bead-shaped segments of graft polymer will tend to agglomerate upon melting, making dispersion of them by mixing difficult.

(d)(i). Thermoplastic elastomers include, for example, an SBR rubber, which is a copolymer of styrene and butadiene typically containing about 23% styrene. Of the butadiene content, about 18% of it is cis, 65% is trans and 17% is vinyl. The monomers themselves can be randomly dispersed along the backbone, or blocks of each monomer can be randomly dispersed. Such SBR rubbers are discussed in greater detail in Zelinski, U.S. Pat. No. 2,975,160 and Zelinski, U.S. Pat. No. 3,281,383.

Thermoplastic elastomers also include block copolymers which can be either linear or branched, and can be either a di-block ("A-B") copolymer, tri-block ("A-B-A") copolymer, or radial teleblock copolymer with or without tapered sections, i.e. portions of the polymer where the monomers alternate or are in random order close to the point of transition between the A and B blocks. The A portion is made by polymerizing one or more mono-alkenyl or vinyl aromatic hydrocarbon monomers, and has an average molecular weight of about 4,000 to about 115,000, and a weight preferably of about 8,000 to about 60,000. The B portion of the block copolymer results from polymerizing a diene and has a molecular weight of about 20,000 to about 450,000, and a weight preferably of about 50,000 to about 300,000. In the A-B di-block copolymer, each block, A or B, can vary from 10-90% of the total weight of the copolymer. In the A-B-A tri-block copolymer, the A end groups typically constitute about 2 wt. % to about 55 wt. % of the whole block copolymer, and preferably are between 5 wt. % and 30 wt. % of the whole block copolymer.

The A block of the block copolymer has properties characteristic of thermoplastic substances in that it has the stability necessary for processing at elevated temperatures and yet possesses good strength below the temperature at which it softens. The A block is polymerized predominantly from vinyl aromatic hydrocarbons, and substituted derivatives thereof wherein the aromatic moiety can be either mono- or polycyclic. Monomers from which the thermoplastic end blocks can be formed are, for example, styrene and substituted derivatives thereof such as α-methyl styrene, vinyl xylene, vinyl naphthalene, and the like, and mixture of two or more thereof. Other vinyl monomers such as methyl acrylate, methyl methacrylate, acrylonitrile or vinyl pyridine may be used in the formation of the A block together with the aromatic monomers. The polymerization can be initiated by lithium metal, or alkyl- or aryl lithium compounds such as butyl lithium or isoamyl lithium. Polymerization is normally conducted at temperatures ranging from about −20° C. to about 100° C.

The B block of the copolymer can be formed, for example, simple by injecting suitable monomer into the reaction vessel and displacing the lithium radical from the just-polymerized A block, which then acts as an initiator because it is still charged. The B block is formed predominantly from substituted or unsubstituted $C_2$-$C_{10}$ dienes, particularly conjugated dienes such as butadiene or isoprene. Other diene, vinyl or olefinic monomers such as chloroprene, 1,4-pentadiene, isobutylene, ethylene or vinyl chloride may be used in the formation of the B block provided that they are present at a level low enough to not alter the fundamental olefinic character of the B block. The mid block will be characterized by elastomeric properties which allow it to to absorb and dissipate an applied stress and then regain its shape.

In the A-B-A tri-block copolymer, the second end block A can be formed in a manner similar to the first, by injecting appropriate alkenyl aromatic monomer (as described above) into the reaction vessel. Alternatively, a bivalent lithium initiator can be used, which, when brought together with the diene monomer under the same conditions described above, will form an elastomeric mid block B which carries a charge at each end. Then, upon addition of alkenyl aromatic monomer to the reaction mixture, a thermoplastic end block A will form on both ends of the mid block B, yielding a thermoplastic elastomeric A-B-A copolymer.

To reduce oxidative and thermal instability, the block copolymers used herein can also desirably be hydrogenated to reduce the degree of unsaturation on the polymer chain and on the pendant aromatic rings. The block copolymer may be selectively hydrogenated by hydrogenating only the elastomeric block B. Typical hydrogenation catalysts utilized are Raney nickel, molybdenum sulfide, finely divided palladium and platinum oxide. The hydrogenation reaction is typically run at 75°–450° F. and at 100–1,000 psig for 10–25 hours.

The most preferred block thermoplastic elastomers are vinyl aromatic/conjugated diene block copolymers formed from styrene and butadiene or styrene and isoprene. When the styrene/butadiene copolymers are hydrogenated, they are frequently represented as styrene/ethylene/butylene (or styrene/ethylene/butylene/styrene in the tri-block form) copolymers. When the styrene/isoprene copolymers are hydrogenated, they are frequently represented as styrene/ethylene/propylene (or styrene/ethylene/propylene/styrene in the tri-block form) copolymers. The block copolymers described above are discussed in greater detail in Holden, U.S. Pat. No. 3,265,766; Haefele, U.S. Pat. No. 3,333,024; Wald, U.S. Pat. No. 3,595,942; and Witsiepe, U.S. Pat. No. 3,651,014.

Thermoplastic elastomers also include A-B-A or A-B block copolymers which have a rigid block "A" having a $T_g$ above room temperature (approximately 23°–25° C.) and a rubbery block "B" having a $T_g$ below room temperature prepared from substances other than those described above. Examples of typical pairings of materials to form the respective A and B blocks of a block copolymer thermoplastic elastomer are shown in Table I.

TABLE I

| Block Copolymer Pairings | |
|---|---|
| A block | B block |
| polyethylene | ethylene/butylene copolymer |
| polyurethane | polyester polyether |
| polyester | polyether |
| polypropylene | EPDM rubber |

Block copolymer thermoplastic elastomers can be prepared, for example, by anionic polymerization using an alkyl-lithium initiator. Thermoplastic elastomers based on urethane are discussed in greater detail in Schollenberger, U.S. Pat. No. 3,015,650 and Saunders, U.S. Pat. No. 3,214,411; and those based on copolyester-ether are discussed in Witsiepe, U.S. Pat. No. 3,651,014.

(d)(ii). The core-shell graft copolymer elastomers used in this invention can be based on either a diene rubber, an acrylate rubber or on mixtures thereof.

A diene rubber contains a substrate latex, or core, which is made by polymerizing a diene, preferably a conjugated diene, or by copolymerizing a diene with a mono-olefin or polar vinyl compound, such as styrene, acrylonitrile, or an alkyl ester of an unsaturated carboxylic acid such as methyl methacrylate. The substrate latex is typically made up of about 40–85% diene, preferably a conjugated diene, and about 15–60% of the mono-olefin or polar vinyl compound. The elastomeric core phase should have a glass transition temperature ("$T_g$") of less than about 10° C., and preferably less than about −20° C. a mixture of monomers is then graft polymerized to the substrate latex. A variety of monomers may be used for this grafting purpose, of which the following are exemplary: vinyl compounds such as vinyl toluene or vinyl chloride; vinyl aromatics such as styrene, alpha-methyl styrene or halogenated styrene; acrylonitrile, methacrylonitrile or alpha-halogenated acrylonitrile; a $C_1$-$C_8$ alkyl acrylate such as ethyl acrylate or hexyl acrylate; a $C_1$-$C_8$ alkyl methacrylate such as methyl methacrylate or hexyl methacrylate; acrylic or methacrylic acid; and the like or a mixture of two or more thereof.

The grafting monomers may be added to the reaction mixture simultaneously or in sequence, and, when added in sequence, layers, shells or wart-like appendages can be built up around the substrate latex, or core. The monomers can be added in various ratios to each other although, when just two are used, they are frequently utilized in equal amounts. A typical weight ratio for methyl methacrylate/butadiene/styrene copolymer ("MBS" rubber) is about 60–80 parts by weight substrate latex, about 10–20 parts by weight of each of the first and second monomer shells. A preferred formulation for an MBS rubber is one having a core built up from about 71 parts of butadiene, about 3 parts of styrene, about 4 parts of methyl metacrylate and about 1 part of divinyl benzene; a second phase of about 11 parts of styrene; and a shell phase of about 11 parts of methyl methacrylate and about 0.1 part of 1,3-butylene glycol dimethacrylate, where the parts are by weight of the total composition. A diene-based, core-shell graft copolymer elastomer and methods for making same, as described above, are discussed in greater detail in Saito, U.S. Pat. No. 3,287,443, Curfman, U.S. Pat. No. 3,657,391, and Fromuth, U.S. Pat. No. 4,180,494.

An acrylate rubber has a first phase forming an elastomeric core and a second phase forming a rigid thermoplastic phase about said elastomeric core. The elastomeric core is formed by emulsion or suspension polymerization of monomers which consist of at least about 50 weight percent alkyl and/or aralkyl acrylates having up to fifteen carbon atoms, and, although longer chains may be used, the alkyls are preferably $C_2-C_6$, most preferably butyl acrylate. The elastomeric core phase should have a $T_g$ of less than about 10° C., and preferably less than about −20° C.

The rigid thermoplastic phase of the acrylate rubber is formed on the surface of the elastomeric core using suspension or emulsion polymerization techniques. The monomers necessary to create this phase together with necessary initiators are added directly to the reaction mixture in which the elastomeric core is formed, and polymerization proceeds until the supply of monomers is substantially exhausted. Monomers such as an alkyl ester of an unsaturated carboxylic acid, for example a $C_1-C_8$ alkyl acrylate like methyl acrylate, hydroxy ethyl acrylate or hexyl acrylate, or a $C_1-C_8$ alkyl methacrylate such as methyl methacrylate or hexyl methacrylate, or mixtures of any of the foregoing, are some of the monomers which can be used for this purpose. Either thermal or redox initiator systems can be used. Because of the presence of the graft linking agents on the surface of the elastomeric core, a portion of the chains which make up the rigid thermoplastic phase are chemically bonded to the elastomeric core. It is preferred that there be at least about 20% bonding of the rigid thermoplastic phase to the elastomeric core.

A preferred acrylate rubber is made up of more than about 40% to about 95% by weight of an elastomeric core and about 60% to about 5% of a rigid thermoplastic phase. The elastomeric core can be polymerized from about 75% to about 99.8% by weight $C_1-C_6$ acrylate, preferably n-butyl acrylate. The rigid thermoplastic phase can be polymerized from at least 50% by weight of $C_1-C_8$ alkyl methacrylate, preferably methyl methacrylate. Acrylate rubbers and methods for making same, as described above, are discussed in greater detail in Owens, U.S. Pat. No. 3,808,180 and Witman, U.S. Pat. No. 4,299,928.

(d)(iii). Olefinic elastomers useful as an impact modifier in this invention are based generally on a long-chain, hydrocarbon backbone, which may or may not be grafted with one or more vinyl monomers. Representative examples of a few of olefinic elastomers are described below to illustrate the variation in the known substances which would suffice for such purpose.

Butyl rubber is the product of copolymerizing isobutylene and isoprene where the isoprene typically makes up no more than 2.5 mole percent of the copolymer. Although a solution process can be used to manufacture butyl rubber, most of it is made by a precipitation (slurry) method wherein the monomers are copolymerized in methyl chloride diluent using a catalyst such as aluminum chloride. Butyl rubbers, as described above, are discussed in greater detail in Green, U.S. Pat. No. 2,401,754 and Nelson, U.S. Pat. No. 2,462,123.

Chlorosulfonated polyethylene rubbers are prepared by bubbling a mixture of chlorine and sulfur dioxide into a solution containing polyethylene, and the rubber product typically contains 20-40 parts chlorine as secondary alkyl chlorides and 1-2 parts sulfur as secondary sulfonyl chlorides. Chlorosulfonated polyethylene rubbers, as described above, are discussed in greater detail in Beekly, U.S. Pat. No. 2,640,048 and Kalil, U.S. Pat. No. 2,923,979.

Although the presence of the pendant methyl group give EPM (ethylene/propylene) copolymer rubber a structure similar to that of natural rubber, EPM rubber has no double bonds in the backbone. The ratio of ethylene to propylene in EPM rubber is from about 50/50 to about 75/25. However, this lack of unsaturation in the backbone precludes vulcanization, and a diene, such as hexadiene-1,5-norbornadiene-ethylidene-norbornene, is therefore frequently added to the copolymer to furnish a pendant group containing an addition polymerizable C=C bond. When a diene is copolymerized with ethylene and propylene, the product is known as EPDM rubber, which may or may not be grafted with one or more vinyl monomers, such as a styrenic monomer. EPM/EPDM rubbers, which can be made by the solution process, are described above and are discussed in greater detail in Paige, U.S. Pat. No. 3,341,503.

Fluorinated rubbers, such as the fluorocarbon elastomer poly(tetrafluorethylene-co-propylene), are made in a high pressure, free radical aqueous emulsion, using organic or inorganic peroxy compounds as initiators. A fluorinated carboxylic acid soap is usually used as the emulsifying agent. Fluorinated elastomers and methods for making same, as described above, are discussed in greater detail in Rexford, U.S. Pat. No. 3,051,677, Honn, U.S. Pat. No. 3,053,818 and Pailthorp, U.S. Pat. No. 2,968,649.

Formation of neoprene rubber is by polymerization of 2-chloro-1,3-butadiene and can result from addition involving both of the double bonds, or through just one of the two leaving the other as a pendant group. Neoprene rubber is typically made by free radical batch emulsion polymerization, but can also be made in a continuous process. Neoprene rubber, as described above, is discussed in greater detail in Collins, U.S. Pat. No. 1,967,865 and Aho, U.S. Pat. No. 2,831,842.

Nitrile rubber, which is polymerized from 1,3-butadiene and acrylonitrile, typically has about 15-50 parts acrylonitrile content. It is usually preferred to make nitrile rubbers by emulsion. A nitrile rubber may or may not be grafted with one or more vinyl monomers. Nitrile rubber and methods for making same, as described above, are discussed in greater detail in Konrad, U.S. Pat. No. 1,973,000.

As with rubbers involving derivative of butadiene, formation of polybutadiene can be by either 1,4 or 1,2 (vinyl) addition of the butadiene molecule. Polybutadiene rubber is typically manufactured by solution polymerization, using organic lithium compounds or coordination catalyst containing metals in reduced valence states. Polybutadiene rubber, as described above, is discussed in greater detail in Brockway, U.S. Pat. No. 2,977,349 and Ueda, U.S. Pat. No. 3,170,907.

Polyisoprene, with its pendant methyl group on what would otherwise be a butadiene unit, also polymerizes in cis-1,4, trans-1,4 or 1,2 (vinyl) form. Cis-1,4 polyisoprene is the synthetic equivalent of natural rubber. Ziegler catalysts can be used in the polymerization of polyisoprene. Polyisoprene and methods for making same, as described above, are discussed in greater detail in Kahn, U.S. Pat. No. 3,165,503.

The olefinic elastomer used herein may also contain reactive moieties. A reactive olefinic elastomer may, for example, be a polymer which has a glass transition temperature ($T_g$) less than 0° C. formed from (A) (I) at least one olefin monomer such as ethylene, propylene, isopropylene, butylene orisobutylene, or at least one conjugated diene such as butadiene, and the like, or mixtures thereof, or (II) a copolymer of one or more olefin monomers, such as described above, with other vinyl monomer(s), but containing a sufficient amount of the olefin monomer(s) to impart a $T_g$ of less than 0° C. to the reactive olefinic elastomer; (B) at least one vinyl (i.e. olefinically unsaturated, including vinylidene) or olefin monomer carrying at least one epoxide group; and, optionally, (C) at least one vinyl (i.e. olefinically unsaturated, including vinylidene) monomer not carrying an epoxide group.

Representative vinyl (i.e. olefinically unsaturated, including vinylidene) monomers useful as the optional component (C) in forming the polymeric reactive olefinic elastomer of this invention include the following: vinyl compounds (especially when they bear a polar, electronegative group or functionality) such as vinyl toluene, alphamethyl styrene, halogenated styrene; those containing nitrile groups such as copolymers of acrylonitrile, methacrylonitrile or alpha-halogenated acrylonitrile; a $C_1-C_8$ alkyl acrylate such as ethyl acrylate, butyl acrylate, hexyl acrylate or hydroxy ethyl acrylate; a $C_1-C_8$ alkyl methacrylate such as methyl methacrylate or hexyl methacrylate; others containing ester groups such as derivatives of acrylic or methacrylic acids, for example esters of said acids and any of the $C_1-C_6$ aliphatic or cycloaliphatic alcohols, especially the $C_1-C_4$ aliphatic or cycloaliphatic alcohols; and acrylic or methacrylic acid; the vinylidene monomers, especially when they bear a polar, electronegative group or functionality such as a halogen group, or an organic group having a double or triple bond such as phenyl, carboxy, cyano or the like; vinyl esters or vinyl ethers, alkenyl-aromatic compounds such as styrene and substituted derivatives thereof; maleirides; mononitriles having alpha-beta-olefinic unsaturation and lower alkyl or halogen substituents; esters of olefinically unsaturated carboxylic acids; aliphatic vinyl compounds such as vinyl chloride, vinylidene chloride, acrylic and methacrylic acid esters, amides and nitriles, vinyl acetate, vinyl propionate and vinyl benzoate; vinyl-methylether, vinyl-ethyl-ether and vinyl-isobutyl-ether; and aromatic vinyl compounds such as styrene, alpha-methyl styrene, vinyl toluene, p-ethylstyrene, 2,4-dimethyl styrene, o-chlorostyrene and 2,5-dichlorostyrene; vinyl esters; vinyl ethers; alpha-olefins; vinyl toluenes; vinyl xylenes; the maleates; the fumarates; and the like; or mixtures of two or more of any of the foregoing. In general, vinyl and vinylidene monomers from groups such as the vinyl and vinylidene -esters, -ethers, -organic acids, -aromatics, -alcohols, -anhydrides, -halides, -nitriles and -amides; or mixtures of any of the foregoing may be used. Additionally, any one or more of the foregoing monomers may be copolymerized with carbon monoxide.

Vinyl monomers such as the foregoing may also be copolymerized as part of the olefin copolymer described above as component (A)(II); or, when carrying an epoxide group, may be used as the component (B). Or, the epoxide group may be carried on an olefin monomer.

Suitable olefinically unsaturated monomers containing epoxide groups for use as component (B) of the terpolymeric reactive olefinic elastomer include, for example, glycidyl esters of unsaturated carboxylic acids (glycidyl methacrylate); glycidyl ethers of unsaturated alcohols (allyl-glycidyl-ether) and of alkenylphenols (isopropenylphenyl-glycidylether); and vinyl and allyl esters of epoxycarboxylic acids (vinyl esters of epoxidized oleic acid). In general, all compounds which contain both a polymerizable unsaturated group and reactive epoxide groups in the molecule can be used for preparation of the reactive olefinic elastomer of the invention.

Copolymers of 1-25 percent (by weight) of glycidyl methacrylate, 40-95 percent of ethylene, and 4-40 percent of vinyl acetate are particularly suitable for use herein as the polymeric reactive olefinic elastomer. When the optional component (C) is not present in the reactive olefinic elastomer, a copolymer of 1-25 percent (by weight) of glycidyl methacrylate, 75-99 percent of ethylene is preferred.

Copolymers containing epoxide groups may be obtained according to known processes, for example by radical polymerization in chlorobenzene at 80° C. in 50% strength solution. For instance, monomers such as listed above are dissolved in an appropriate solvent, such as benzene, chlorobenzene or toluene, and polymerized at a temperature of about 80° C. by adding azobisisobutyronitrile, whereby oxygen is excluded. After the monomers have been reacted, the solvent used is distilled off (e.g., chlorobenzene at 100° C. and 20 torr) and the residue is dried in vacuum at 100° C. and then powdered. The terpolymeric reactive olefinic elastomer of this invention can also be prepared in gas phase under conditions suitable for polymerizing an olefin. For example, the terpolymer can be made in either a tubular reactor or a stirred autoclave, where heated, pressurized feed streams of olefin or vinyl monomer gas, peroxide free-radical initiator and chain transfer agent are injected into the reaction device. The reaction of formation usually occurs at 1,500-3,000 atm (152-304 MPa) and at a temperature usually not exceeding 300° C., as known in the art.

The molecular weight of the reactive olefinic elastomer is typically between about 10,000 and about 5000,000, preferably between about 30,000 and about 200,000, and it typially contains about 5 to about 1,000, preferably about 20 to about 500, epoxide groups per macromolecule.

Each of the patents cited in the foregoing description of rubbery, impact-modifying elastomers, and methods for the preparation thereof, is incorporated as a part hereof.

A variety of other additives may be used in the compositions of this invention for protection against thermal, oxidative and ultra-violet degradation. Such additives may be included in the composition at any point during the processing, and the choice as to which additive is employed, if any, is not critical to this invention. Representative of the thermal and oxidative stabilizers which can advantageously be utilized are hindered phenols, hydroquinones, phosphites, including substituted members of those groups and/or mixtures of more than one thereof. A preferred phenolic anti-oxidant is Irganox TM 076 anti-oxidant, available from Ciba-Geigy Corp. Ultra-violet stabilizers such as various substituted resorcinols, salicylates, benzotriazoles, benzophines, hindered amines and hindered phenols can also be usefully included in the compositions of this invention, as can be lubricants, colorants, fillers such as talc, clay, phosphate, metal, inorganic or graphite fibers, or mica, pigments, ignition resistant additives and mold release agents, and reinforcement agents such as fiberglass or phosphate, metal, inorganic or graphite fibers. Additives and stabilizers such as the foregoing, and many others which have not been mentioned, are known in the art, and the decision as to which, if any, to use if not critical to this invention. However, such additives, if used, typically do not exceed 5% by weight of the total composition, except fillers or reinforcing agents, which may constitute up to 40% of the composition.

Illustrative Embodiments. To illustrate the practice of this invention, examples of several preferred embodiments are set forth below. It is not intended, however, that these examples (Examples 1-24) should in any manner restrict the scope of this invention. Some of the particularly desirable features of this invention may be seen by contrasting the characteristics of Examples flection temperature under load of 300° F. (determined according to ASTM Designation D648-82), available from General Electric Company;

"(6) Kraton ™ G 1651" is hydrogenated styrene/-butadiene block thermoplastic elastomer copolymer from Shell Oil Company;

"(7) E/VA/GMA" is a terpolymer containing ethylene, vinyl acetate and glycidyl methacrylate and having a weight-average molecular weight of approximately 100,000, available from Sumitomo Chemical America; and "(8) GRC 120" is a core-shell graft polymer containing approximately 50% rubber wherein styrene and acrylonitrile are grafted onto a butadiene core.

TABLE II

|  | Content of Controls A-H in parts by weight | | | | | | | |
|---|---|---|---|---|---|---|---|---|
|  | A | B | C | D | E | F | G | H |
| (1) Bisphenol-AP PC | 1,300 | 1,300 | 1,300 | 1,200 | 800 | — | — | 1,300 |
| (2) Brominated PC I | — | — | — | — | — | 1,300 | — | — |
| (3) Brominated PC II | — | — | — | — | — | — | 1,300 | — |
| (4) Polyester | 500 | 500 | 500 | 500 | 750 | 500 | 500 | 500 |
| (5) Polyphenylene Ether I | — | — | — | — | — | — | — | 200 |
| (6) Kraton ™ G 1651 | 200 | — | — | 100 | 200 | — | 200 | — |
| (7) E/VA/GMA | — | 200 | — | 200 | 250 | 200 | — | — |
| (8) GRC 120 | — | — | 200 | — | — | — | — | — |

1-24 with those of controlled formulations (Control A-K) which do not possess the features of, and are not therefore embodiments of, this invention.

The polycarbonate compositions prepared in Controls A-K and Examples 1-24 are made by dry blending the ingredients thereof and agitating same in a paint shaker for 7 minutes. The dry blended formulations are then melt mixed in a vented 30 mm Werner-Pfleiderer co-rotating, twin screw extruder using a 250 rpm speed and a set temperature in the range of 290°-320° C., the set temperature being sufficient in relation to the $T_g$ of the material to obtain melting thereof in the extruder. Each extruded composition is passed through a water bath, chopped into granules and collected for molding. Granules are thoroughly dried in a circulated air oven at 115° C. for six hours prior to molding. All samples are prepared by injection molding on a 75 ton ($6.8 \times 10^4$ kg) Arburg molding machine. Molding temperatures for the barrel and mold are set at 290°-310° C. and 190° F., respectively.

The formulations of the polycarbonate compositions of Controls A-H are given below in Table II in parts by weight of the total composition. In Table II:

"(1) Bisphenol-AP PC" is a polycarbonate prepared from Bisphenol-AP [1,1-bis(4-hydroxyphenyl)-1-phenyl ethane] having a $T_g$ of 190° C. and a weight average molecular weight of 30,000;

"(2) Brominated PC I" is a polycarbonate prepared from mixture of Bisphenol-A ("Bis-A") and Tetrabromo Bisphenol-A ("TBBA") in a 2/1 Bis-A/TBBA molar ratio, having a $T_g$ of 190° C. and a weight average molecular weight of 30,000;

"(3) Brominated PC II" is a polycarbonate prepared from mixture of Bisphenol-A ("Bis-A") and Tetrabromo Bisphenol-A ("TBBA") in a 4/1 Bis-A/TBBA molar ratio, having a $T_g$ of 175° C. and a weight average molecular weight of 30,000;

"(4) Polyester" is a polyethylene terephthalate having an inherent viscosity of 1.04 (determined according to ASTM Designation D 4603-86), available as 1006 polyester from Goodyear Tire and Rubber Co.;

"(5) Polyphenylene Ether I" is Noryl ™ N300 polyphenylene ether/styrenic polymer alloy, having a de- The results of several tests performed on the blended polycarbonate compositions of Controls A-H are shown below in Table III. In Table III:

"(1) DTUL" is deflection temperature under load as measured in accordance with ASTM Designation D 648-82 at 66 psi;

"(2) Izod" is impact resistance as measured by the Izod test according to ASTM Designation D 256-84 (Method A) at 23° C. The notch is 10 mils (0.254 mm) in radius, and is cut so that the flexural shock caused by the striking nose of the pendulum is propagated (parallel or perpendicular?) to the direction of flow taken by the molten extrudate during formation of the sample;

"(3) Weldline" is also measured by the Izod test according to ASTM Designation D 256-84 (Method A) at 23° C., but with respect to a sample which has been formed with a butt weld in a double gated mold. The sample is unnotched, and it is placed in the vise so that the weld is coincident with the top surface of the vise jaws;

"(4) Dart Drop" is the Gardner dart drop impact test, which is performed at room temperature by dropping a 16 pound (7.26 km) weight, carrying a ½" (12.7 mm) dart, onto a circular test sample which is 2½" (63.5 mm) in diameter and ⅛" (3.175 mm) thick. The weighted dart falls freely on a slotted track and impacts the sample, which is secured in position in the path of descent on an aluminum cast base with a 0.640 inch (16.26 mm) hole to accept the dart after it impacts the sample. The instrument is a Pacific Scientific model no. IG-1120. The sample fails if it shows a crack or perforation on the side opposite from that on which impact occured. The results are either pass (no break or perforation by the dart at the point of impact) or fail (material exhibits crack or perforation) when the dart has developed a particular amount of energy by falling from the necessary height on the track, as indicated thereon, to develop such energy. The result appearing in Table III is the greatest amount of energy a sample could accept without failing;

"(5) Flexural Modulus" is flexural modulus as measured in accordance with ASTM Designation D 790-84a.

"(6) Retention of Elongation" is evaluated with respect to (a) samples which are (i) annealed 250° F. for thirty minutes, (ii) placed under 0.5% strain while submerged in a bath of 60 wt. % isooctane and 40 wt. % toluene for 5 minutes, and (iii) allowed to dry for 24 hours before testing; and (b) annealed samples which are not soaked in the solvent bath. Percent elongation at break, in accordance with ASTM Designation D 638-84, is measured with respect to each kind of sample, and a ratio is formed containing the elongation of the solvent-treated sample in the numerator and the elongation of the untreated sample in the denominator. This ratio is expressed as a percentage, and is reported as the portion (i.e. percentage) of the elongation of the untreated sample that is retained by, and thus possessed as a property of, the solvent-treated sample, after the solvent bath. Where the percentage reported exceeds 100, the solvent-soaked sample shows greater elongation at break than the untreated sample.

all also brittle, as can be seen respectively from the undesirably low Izod impact results.

The formulations of the polycarbonate compositions of Examples 1-8 are given below in Table IV in parts by weight of the total composition. In Table IV, all references are to the same materials used in Controls A-H, as described above, except that "(9) PA-2130" is a core-shell graft polymer containing 75% rubber, available from M&T Chemical Co., wherein styrene and methyl methacrylate are grafted onto a butadiene core.

The tests performed on Controls A-H are also performed on Examples 1-8. The results of those tests are shows below in Table V.

TABLE IV

| | Content of Examples 1-8 in Parts by Weight | | | | | | | |
|---|---|---|---|---|---|---|---|---|
| | 1 | 2 | 3 | 4 | 5 | 6 | 7 | 8 |
| (1) Bisphenol-AP PC | 1,200 | 1,200 | 1,200 | 1,100 | 800 | 800 | — | — |
| (2) Brominated PC I | — | — | — | — | — | — | 1,200 | — |
| (3) Brominated PC II | — | — | — | — | — | — | — | 1,150 |
| (4) Polyester | 500 | 500 | 500 | 500 | 750 | 800 | 500 | 500 |
| (5) Polyphenylene Ether I | 100 | 100 | 100 | 100 | 200 | 100 | 100 | 150 |
| (6) Kraton ™ G 1651 | 200 | — | — | 100 | — | 50 | — | 200 |
| (7) E/VA/GMA | — | — | 200 | 200 | 250 | 200 | 200 | — |
| (8) GRC 120 | — | — | — | — | — | 50 | — | — |
| (9) PA 2130 | — | 200 | — | — | — | — | — | — |

TABLE V

| | Test Results of Examples 1-8 | | | | | | | |
|---|---|---|---|---|---|---|---|---|
| | 1 | 2 | 3 | 4 | 5 | 6 | 7 | 8 |
| (1) DTUL, °F. | 326 | 319 | 336 | 325 | 288 | 277 | 327 | 242 |
| (2) Izod, ft-lb/in | 9.0 | 8.4 | 9.6 | 7.5 | 3.2 | 5.6 | 1.6 | 10.1 |
| (3) Weldline Izod, ft-lb/in | 3.6 | 7.8 | 13.0 | 5.9 | 5.9 | 10.6 | 3.8 | 1.6 |
| (4) Dart Drop, in-lb | 500 | 400 | 475 | 425 | 300 | 250 | 400 | 450 |
| (5) Flexural Modulus, psi × $10^5$ | 3.33 | 3.73 | 3.61 | 2.54 | 2.86 | 2.41 | 2.81 | 2.77 |
| (6) Retention of Elongation | 87 | — | 128 | 108 | — | 82 | 110 | — |

The formulations of the polycarbonate compositions of Control J and Examples 9-12 are given below in Table VI in parts by weight of the total composition. In Table VI, all references are to the same materials used in Controls A-H, as described above. Three of the same tests performed on Controls A-H are performed on Control J and Examples 9-12. The results of those tests are also shown below in Table VI.

TABLE III

| | Test Results of Controls A-H | | | | | | | |
|---|---|---|---|---|---|---|---|---|
| | A | B | C | D | E | F | G | H |
| (1) DTUL, °F. | 331 | 329 | 321 | 325 | 191 | 328 | 303 | 328 |
| (2) Izod, ft-lb/in | 4.3 | 1.5 | 3.3 | 2.5 | 1.5 | 1.2 | 3.5 | 1.1 |
| (3) Weldline Izod, ft-lb/in | 0.8 | 4.2 | 2.3 | 2.1 | 3.0 | 4.0 | 1.3 | 1.9 |
| (4) Dart Drop, in-lb | 400 | 290 | 450 | 300 | <50 | 350 | 450 | 450 |
| (5) Flexural Modulus, psi × $10^5$ | 3.18 | 3.30 | 3.79 | 2.67 | 1.98 | 2.71 | 3.06 | 4.27 |
| (6) Retention of Elongation | — | — | 128 | — | — | 104 | — | — |

The results of the tests performed on Controls A-H demonstrate that neither a polyphenylene ether nor an elastomeric impact modifier alone is sufficient to relieve the brittle condition of a blend of a high heat polycarbonate and a polyester. Controls A-G all contain one or more elastomeric impact modifiers but no polyphenylene ether. Control H contains polyphenylene ether but no elastomeric impact modifier. The blended formulations of Controls A-H are all high heat materials, as can be seen rom the respective DTUL results, but they are

TABLE VI

| Content in Parts by Weight, and Test Results, for Control J and Examples 9-12 | | | | | |
|---|---|---|---|---|---|
| | J | 9 | 10 | 11 | 12 |
| (1) Bisphenol-AP PC | 1,200 | 1,200 | 1,200 | 1,200 | 1,200 |
| (4) Polyester | 600 | 580 | 540 | 500 | 460 |
| (5) Polyphenylene Ether I | — | 20 | 60 | 100 | 140 |
| (6) Kraton ™ G 1651 | 200 | 200 | 200 | 200 | 200 |
| (1) DTUL, °F. | 326 | 326 | 326 | 326 | 326 |
| (2) Izod, ft-lb/in | 3.6 | 10.0 | 8.8 | 8.8 | 8.8 |
| (4) Dart Drop, in-lb | 464 | 496 | 520 | 528 | 528 |

The results of the tests performed on Examples 1-12 demonstrate that when both a polyphenylene ether and an elastomeric impact modifier are admixed with a blend of a high heat polycarbonate and a polyester, desirably high DTUL is preserved while desirably high Izod impact value is attained—a balance of desirable properties. For instance, Examples 1-4 and 8-12 all have a DTUL which clearly indicates a high heat material—a material with superior resistance to thermal deformation, but they also have an Izod impact value which clearly indicates that the material is ductile. Examples 5 and 6 show improved DTUL over the corresponding control with high polyester content, and Example 7 shows a composition with extremely favorable heat and solvent resistance.

The formulations of the polycarbonate compositions of Examples 13-21 are given below in Table VII in parts by weight of the total composition. In Table VII, all references are to the same materials used in Controls A-H, as described above, except that:

"(10) Polyphenylene Ether II" is Noryl ™ N190 polyphenylene ether/styrenic polymer alloy, having a DTUL of 190° F., available from General Electric Company; and "(11) Polyphenylene Ether III" is Noryl ™ N225 polyphenylene ether/styrenic polymer alloy, having a DTUL of 225° F., available from General Electric Company.

Three of the tests performed on Controls A-H are also performed on Examples 13-21. The results of those tests are shown below in Table VIII.

F. and 125° F. The results of those tests are shown below in Table X.

TABLE IX

| Content of Control K and Examples 22-24 in Parts by Weight | | | | |
|---|---|---|---|---|
| | K | 22 | 23 | 24 |
| (4) Polyester | 600 | 540 | 600 | 600 |
| (5) Polyphenylene Ether I | — | 140 | 140 | 140 |
| (6) Kraton ™ G 1651 | 160 | 160 | 160 | 160 |
| (12) Fluorene PC | 1,240 | 1,160 | 1,100 | — |
| (13) Co-Polyester/PC | — | — | — | 1,100 |

TABLE X

| Test Results of Control K and Examples 22-24 | | | | |
|---|---|---|---|---|
| | K | 22 | 23 | 24 |
| (1) DTUL, °F. | 394 | 376 | 381 | 286 |
| (2) Izod, 75° F., ft-lb/in | 1.9 | 3.5 | 4.1 | 10.5 |
| (2) Izod, 100° F., ft-lb/in | 3.0 | 5.0 | 8.5 | — |
| (2) Izod, 125° F., ft-lb/in | 3.8 | 9.4 | 9.0 | — |
| (4) Dart Drop, in-lb | — | 512 | 464 | — |

The results of the tests performed on Examples 13-24 demonstrate that frequently very low amounts of polyphenylene ether are effective together with an impact modifier to reduce the brittleness of a blend of a high heat polycarbonate and a polyester. In addition, Examples 13-22 show desirably high levels of solvent resistance.

It is within the skill in the art to practice this invention in numerous modifications and variations in light of

TABLE VII

| | Content of Examples 13-21 in Parts by Weight | | | | | | | | |
|---|---|---|---|---|---|---|---|---|---|
| | 13 | 14 | 15 | 16 | 17 | 18 | 19 | 20 | 21 |
| (1) Bisphenol-AP PC | 1,120 | 1,120 | 1,120 | 1,120 | 1,120 | 1,120 | 1,120 | 1,120 | 1,120 |
| (4) Polyester | 600 | 600 | 600 | 600 | 600 | 600 | 600 | 600 | 600 |
| (5) Polyphenylene Ether I | — | — | — | — | — | — | 100 | 140 | 180 |
| (6) Kraton ™ G 1651 | 180 | 140 | 100 | 180 | 140 | 100 | 180 | 140 | 100 |
| (10) Polyphenylene Ether II | 100 | 140 | 180 | — | — | — | — | — | — |
| (11) Polyphenylene Ether III | — | — | — | 100 | 140 | 180 | — | — | — |

TABLE VIII

| | Test Results of Examples 13-21 | | | | | | | | |
|---|---|---|---|---|---|---|---|---|---|
| | 13 | 14 | 15 | 16 | 17 | 18 | 19 | 20 | 21 |
| (1) DTUL, °F. | 304 | 314 | 305 | 306 | 316 | 303 | 314 | 322 | 319 |
| (2) Izod, ft-lb/in | 13.6 | 11.0 | 3.1 | 12.6 | 12.0 | 3.7 | 10.1 | 14.6 | 9.6 |
| (6) Retention of Elongation | 107 | 83 | 80 | 92 | 106 | 106 | 93 | 88 | 100 |

The formulations of the polycarbonate compositions of Control K and Examples 22-24 are given below in Table IX in parts by weight of the total composition. In Table IX, all references are to the same materials used in Controls A-H, as described above, except that:

"(12) Fluorene PC" is a polycarbonate having a $T_g$ of 240° C. and a weight average molecular weight of 22,500, prepared from mixture of Bis(hydroxyphenyl)-Fluorene ("Bis-Fluorene") and Bisphenol-A ("Bis-A") in a 1.5/1 Bis-Fluorene/Bis-A molar ratio; and "(13) Co-Polyester/PC" is a copolyester/polycarbonate prepared from iso- and/or terephthalic acid (and/or derivatives thereof) and Bisphenol-A ("Bis-A") in a 3/1 acid/Bis-a ratio, having a $T_g$ of 185° C. and a weight average molecular weight of 29,000.

Three of the tests performed on Controls A-H are also performed on Control K and Examples 22-24, except the Izod impact test performed on Control K and Examples 22 and 23 was performed at 75° F., 100° the above teachings. It is, therefore, to be understood that the various embodiments of this invention described herein may be altered without departing from the spirit and scope of this invention as defined by the appended claims.

What is claimed is:

1. A composition of matter comprising, in admixture, by weight of the total composition, (a) about 40 to about 90 parts of an aromatic polycarbonate which has a glass transition temperature in excess of at least 165° C. and a weight average molecular weight of less than 40,000, (b) about 5 to about 69 parts aromatic polyester, (c) about 1 to about 40 parts polyphenylene ether, and (d) about 1 to about 25 parts elastomeric impact modifier.

2. The composition of claim 1 wherein the content of the aromatic polycarbonate is about 45 to about 85 parts, by weight of the total composition, and the aromatic polycarbonate has a weight average molecular weight of less than 35,000.

3. The composition of claim 1 wherein the polycarbonate is prepared from one or more dihydroxy compounds selected from (a) Tetrahalo Bisphenol-A, (b) Bisphenol-AP, (c) Bis(hydroxyphenyl)Fluorene, and (d) a mixture of one or more of the foregoing with one or more other bisphenols.

4. The composition of claim 1 wherein the polyester is a poly(alkylene dicarboxylate).

5. The composition of claim 1 wherein the polyphenylene ether is blended with up to about 50 percent, by weight of the polyphenylene ether, of a styrenic polymer or copolymer which contains at least 25 percent by weight of structural units derived from a monomer of the formula

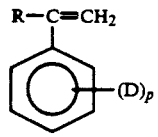

wherein R is hydrogen, lower alkyl or halogen, D is vinyl, halogen or lower alkyl, and p is from 0 to 5.

6. The composition of claim 1 wherein the elastomeric impact modifier is one or more of the members of the group consisting of a thermoplastic elastomer and a core-shell grafted copolymer.

7. The composition of claim 6 wherein the thermoplastic elastomer ia an A-B-A or A-B block copolymer which has a rigid block "A" having a glass transition temperature above the range of about 23°-25° C., and a rubbery block "B" having a glass transition temperature below the range of about 23°-25° C.

8. The composition of claim 7 wherein the block "A" is polymerized from a vinyl aromatic compound and the block "B" is polymerized from an olefin or diene.

9. The composition of claim 7 wherein the block copolymer is selectively hydrogenated, and the block "A" is polymerized from styrene and the block "B" is polymerized from butadiene.

10. The composition of claim 6 wherein the core-shell grafted copolymer is characterized in that
   (a) it comprises greater than 40 percent rubber by weight,
   (b) its core comprises a conjugated diene or of a $C_1$-$C_{15}$ acrylate, said core having a glass transition temperature below about 0° C., and
   (c) its grafted phase comprises a carboxylic acid ester of a saturated aliphatic alcohol, acrylic or methacrylic acid, a vinyl nitrile compound, a vinyl aromatic compound, or a mixture thereof.

11. The composition of claim 10 wherein the grafted phase of said core-shell graft polymer comprises an acrylic or methacrylic acid ester of a $C_1$-$C_6$ aliphatic alcohol, styrene, acrylonitrile, or a mixture thereof.

12. The composition of claim 1 wherein the elastomeric impact modifier is one or more of the members of the group consisting of (I) a polymer which has a glass transition temperature less than 0° C., and which comprises
   (a) (i) an olefin monomer, or (ii) a copolymer containing a sufficient amount of an olefin monomer to impart a glass transition temperature of less than 0° C. to the polymer; and
   (b) at least one vinyl monomer carrying at least one epoxide group;
(II) butyl rubber; (III) chlorosulfonated polyethylene rubber; (IV) ethylene/propylene copolymer; (V) ethylene/propylene/diene copolymer; (VI) fluorinated rubber; (VII) neoprene; (VIII) nitrile rubber; (IX) polybutadiene; (X) and polyisoprene.

13. The composition of claim 12 wherein component (I), a polymer which has a glass transition temperature less than 0° C., further comprises at least one vinyl monomer not carrying an epoxide group.

14. The composition of claim 12 wherein in component (I), a polymer which has a glass transition temperature less than 0° C., the vinyl monomer carrying at least one epoxide group is a glycidyl ester of an unsaturated carboxylic acid.

15. A composition of matter comprising, in admixture, by weight of the total composition,
   (a) about 40 to about 90 parts of an aromatic polycarbonate which has a glass transition temperature in excess of at least 165° C. and a weight average molecular weight of less than 40,000, prepared from one or more dihydroxy compounds selected from (i) Tetrahalo Bisphenol-A, (ii) Bisphenol-AP, (iii) Bis(hydroxyphenyl)Fluorene, and (iv) a mixture of one or more of the foregoing with one or more other bisphenols;
   (b) about 5 to about 69 parts poly(alkylene dicarboxylate);
   (c) about 1 to about 40 parts polyphenylene ether blended with up to about 50 percent, by weight of the polyphenylene ether, of a styrenic polymer or copolymer which contains at least 25 percent by weight of structural units derived from a monomer of the formula

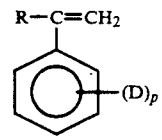

wherein R is hydrogen, lower alkyl or halogen, D is vinyl, halogen or lower alkyl, and p is from 0 to 5; and
   (d) about 1 to about 25 parts of one or more elastomeric impact modifiers selected from the group consisting of
      (i) an A-B-A or A-B block copolymer which has a rigid block "A" having a glass transition temperature above the range of about 23°-25° C., and a rubbery block "B" having a glass transition temperature below the range of about 23°-25° C.;
      (ii) a core-shell grated copolymer characterized in that (A) it comprises greater than 40 percent rubber by weight, (B) its core comprises a conjugated diene or of a $C_1$-$C_{15}$ acrylate, said core having a glass transition temperature below about 0° C., and (C) its grafted phase comprises a carboxylic acid ester of a saturated aliphatic alcohol, acrylic or methacrylic acid, a vinyl nitrile compound, a vinyl aromatic compound, or a mixture thereof;
      (iii) a polymeric olefinic elastomer which has a glass transition temperature less than 0° C., comprising (A) (I) an olefin monomer, or (II) a copolymer containing a sufficient amount of an olefin monomer to impart a glass transition temperature of less than 0° C. to the polymer; and (B) at least one vinyl monomer carrying at least one epoxide group;

(iv) an ethylene/propylene/diene copolymer; and (v) a nitrile rubber.

16. The composition of claim 15 wherein component d(i), the block copolymer, is selectively hydrogenated; component d(iv), the ethylene/propylene/diene copolymer, is grafted with a vinyl monomer; and component d(v), the nitrile rubber, is grafted with a vinyl monomer.

17. The composition of claim 16 wherein the content of component (a), the aromatic polycarbonate, is about 45 to about 85 parts, by weight of the total composition, and the aromatic polycarbonate has a weight average molecular weight of less than 35,000.

18. The composition of claim 16 wherein component (a), the aromatic polycarbonate, is prepared from Bis(hydroxyphenyl)fluorene; a mixture of Bis(hydroxyphenyl)fluorene and one or more other bisphenols; or a mixture of Bis(hydroxyphenyl)fluorene and one or more dicarboxylic acids, or ester-forming derivatives thereof.

19. The composition of claim 16 wherein component (a), the aromatic polycarbonate, is a blend of a polycarbonate prepared from Bis(hydroxyphenyl)fluorene, and a polycarbonate prepared from a mixture of Bis(hydroxyphenyl)fluorene and one or more other bisphenols.

20. The composition of claim 16 wherein component (a), the aromatic polycarbonate, is prepared from Bisphenol-AP; a mixture of Bisphenol-AP and one or more other bisphenols; or a mixture of Bisphenol-AP and one or more dicarboxylic acids, or ester-forming derivatives thereof.

21. The composition of claim 16 wherein component (a), the aromatic polycarbonate, is a blend of a polycarbonate prepared from Bisphenol-AP, and a polycarbonate prepared from a mixture of Bisphenol-AP and one or more other bisphenols.

22. The composition of claim 16 wherein component (a), the aromatic polycarbonate, is prepared from Tetrahalobisphenol-A; a mixture of Tetrahalobisphenol-A and one or more other bisphenols; or a mixture of Tetrahalobisphenol-A and one or more dicarboxylic acids, or ester-forming derivatives thereof.

23. The composition of claim 16 wherein component (a), the aromatic polycarbonate, is a blend of a polycarbonate prepared from Tetrahalobisphenol-A, and a polycarbonate prepared from a mixture of Tetrahalobisphenol-A and one or more other bisphenols.

24. The composition of claim 16 wherein component (a), the aromatic polycarbonate, is prepared from a mixture of one or more dicarboxylic acids, or ester-forming derivatives thereof, and one or more bisphenols.

25. The composition of claim 16 wherein component (d)(iii), the polymeric olefinic elastomer, further comprises at least one vinyl monomer not carrying an epoxide group.

26. The composition of claim 1, 15 or 16 in the form of a molded article.

27. A method of forming an article from a high heat polycarbonate blend comprising (a) providing a high heat polycarbonate blend by admixing, by weight of the total composition, (i) about 40 to about 90 parts of an aromatic polycarbonate which has a glass transition temperature in excess of at least 165° C. and a weight average molecular weight of less than 40,000, (ii) about 5 to about 69 parts aromatic polyester, (iii) about 1 to about 40 parts polyphenylene ether, and (iv) about 1 to about 25 parts elastomeric impact modifier;

(b) softening said high heat polycarbonate blend by the application of heat; and (c) forming said heat-softened high heat polycarbonate blend into an article.

28. The method of claim 27 wherein said step (b) comprises a step of melting said high heat polycarbonate blend.

29. The method of claim 27 wherein said step (c) comprises a step of forming said heat-softened high heat polycarbonate blend by performing on said heat-softened polycarbonate blend one or more of the operations of extruding, molding, rolling, drawing or spinning.

30. A method of compounding a high heat polycarbonate blend comprising (a) providing a high heat polycarbonate blend by admixing, by weight of the total composition, (i) about 40 to about 90 parts of an aromatic polycarbonate which has a glass transition temperature in excess of 165° C. and a weight average molecular weight of less than 40,000, (ii) about 5 to about 69 parts aromatic polyester, (iii) about 1 to about 40 parts polyphenylene ether, and (iv) about 1 to about 25 parts elastomeric impact modifier; and (b) compounding said high heat polycarbonate blend with one or more other organic or inorganic substances.

31. The composition of claim 2 wherein the polycarbonate is prepared from one or more dihydroxy compounds selected from (a) Tetrahalo Bisphenol-A, (b) Bisphenol-AP, (c) Bis(hydroxyphenyl)Fluorene, and (d) a mixture of one or more of the foregoing with one or more other bisphenols.

32. The composition of claim 2 wherein the polyphenylene ether is blended with up to about 50 percent, by weight of the polyphenylene ether, of a styrenic polymer or copolymer which contains at least 25 percent by weight of structural units derived from a monomer of the formula

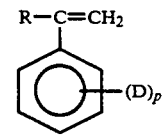

wherein R is hydrogen, lower alkyl or halogen, D is vinyl, halogen or lower alkyl, and p is from 0 to 5.

33. The composition of claim 2 wherein the elastomeric impact modifier is a thermoplastic elastomer which is an A-B-A or A-B block copolymer which has a rigid block "A" having a glass transition temperature above the range of about 23°–25° C., and a rubbery block "B" having a glass transition temperature below the range of about 23°–25° C.

34. The composition of claim 2 wherein the elastomeric impact modifier is a core-shell grafted copolymer which is characterized in that (a) it comprises greater than 40 percent rubber by weight, (b) its core comprises a conjugated diene or of a $C_1$-$C_{15}$ acrylate, said core having a glass transition temperature below about 0° C., and (c) its grafted phase comprises a carboxylic acid ester of a saturated aliphatic alcohol, acrylic or methacrylic acid, a vinyl nitrile compound, a vinyl aromatic compound, or a mixture thereof.

35. The composition of claim 2 wherein the elastomeric impact modifier is an olefinic elastomer which is a polymer having a glass transition temperature less than 0° C., and which comprises
   (a) (i) an olefin monomer, or (ii) a copolymer containing a sufficient amount of an olefin monomer to impart a glass transition temperature of less than 0° C. to the polymer; and
   (b) at least one vinyl monomer carrying at least one epoxide group.

36. The composition of claim 17 wherein component (a), the aromatic polycarbonate, is prepared from Bis(hydroxyphenyl)fluorene; a mixture of Bis(hydroxyphenyl)fluorene and one or more other bisphenols; or a mixture of Bis(hydroxyphenyl)fluorene and one or more dicarboxylic acids, or ester-forming derivatives thereof.

37. The composition of claim 17 wherein component (a), the aromatic polycarbonate, is a blend of a polycarbonate prepared from Bis(hydryoxyphenyl)fluorene, and a polycarbonate prepared from a mixture of Bis(hydroxyphenyl)fluorene and one or more other bisphenols.

38. The composition of claim 17 wherein component (a), the aromatic polycarbonate, is prepared from Bisphenol-AP; a mixture of Bisphenol-AP and one or more other bisphenols; or a mixture of Bisphenol-AP and one or more dicarboxylic acids, or ester-forming derivatives thereof.

39. The composition of claim 17 wherein component (a), the aromatic polycarbonate, is a blend of a polycarbonate prepared from Bisphenol-AP, and a polycarbonate prepared from a mixture of Bisphenol-AP and one or more other bisphenols.

40. The composition of claim 17 wherein component (a), the aromatic polycarbonate, is prepared from Tetrahalobisphenol-A; a mixture of Tetrahalobisphenol-A and one or more other bisphenols; or a mixture of Tetrahalobisphenol-A and one or more dicarboxylic acids, or ester-forming derivatives thereof.

41. The composition of claim 17 wherein component (a), the aromatic polycarbonate, is a blend of a polycarbonate prepared from Tetrahalobisphenol-A, and a polycarbonate prepared from a mixture of Tetrahalobisphenol-A and one or more other bisphenols.

42. The composition of claim 17 wherein component (a), the aromatic polycarbonate, is prepared from a mixture of one or more dicarboxylic acids, or ester-forming derivatives thereof, and one or more bisphenols.

43. The molded article of claim 26 which is an automotive component.

* * * * *